United States Patent
Tsiava et al.

(10) Patent No.: US 6,890,498 B2
(45) Date of Patent: May 10, 2005

(54) BURNER AND METHOD FOR PARTLY OXIDISING A GAS STREAM COMPRISING HYDROGEN SULPHIDE AND AMMONIA

(75) Inventors: Rémi Pierre Tsiava, Saint Germain-les-Corbeil (FR); Manuel Binoist, Paris (FR); Benoit Grand, Versailles (FR); Richard Soula, Vertou (FR); Denis Cieutat, Neuilly sur Seine (FR)

(73) Assignee: L'Air Liquide, Société Anonyme á Directorie et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/415,919
(22) PCT Filed: Oct. 29, 2001
(86) PCT No.: PCT/FR01/03359

§ 371 (c)(1),
(2), (4) Date: May 2, 2003

(87) PCT Pub. No.: WO02/37025

PCT Pub. Date: May 10, 2002

(65) Prior Publication Data

US 2004/0009446 A1 Jan. 15, 2004

(30) Foreign Application Priority Data

Nov. 2, 2000 (FR) .............................. 00/14066

(51) Int. Cl.[7] .......................... C01B 17/04; F23D 14/22
(52) U.S. Cl. .................... 423/220; 423/237; 423/574.1; 431/9; 431/10; 431/182; 431/186; 431/187
(58) Field of Search .......................... 423/574.1, 574.2, 423/575, 237, 238, 220; 431/159, 186, 189, 181, 182, 187, 8–10

(56) References Cited

U.S. PATENT DOCUMENTS

| | | | | | |
|---|---|---|---|---|---|
| 3,782,884 | A | * | 1/1974 | Shumaker | 431/186 |
| 3,963,443 | A | * | 6/1976 | Bond et al. | 422/189 |
| 4,035,158 | A | * | 7/1977 | Scott et al. | 422/160 |
| 4,208,180 | A | * | 6/1980 | Nakayasu et al. | 431/284 |
| 4,394,119 | A | * | 7/1983 | Waller et al. | 431/5 |
| 4,933,163 | A | * | 6/1990 | Fischer et al. | 423/574.1 |
| 4,988,287 | A | * | 1/1991 | Stegelman et al. | 431/284 |
| 5,615,833 | A | * | 4/1997 | Robillard et al. | 239/132.3 |
| 5,743,723 | A | * | 4/1998 | Iatrides et al. | 431/8 |
| 6,042,803 | A | * | 3/2000 | Watson | 423/574.1 |
| 6,083,466 | A | * | 7/2000 | Djavdan et al. | 423/210 |
| 6,312,651 | B1 | * | 11/2001 | Watson et al. | 422/182 |
| 6,328,940 | B1 | * | 12/2001 | Djavdan et al. | 423/224 |
| 6,352,680 | B1 | * | 3/2002 | Watson et al. | 423/573.1 |
| 6,455,012 | B1 | * | 9/2002 | Walker | 422/182 |

FOREIGN PATENT DOCUMENTS

| EP | 0 810 974 B1 | 8/1999 |
|---|---|---|
| EP | 0 974 552 A2 | 1/2000 |

* cited by examiner

Primary Examiner—Stanley S. Silverman
Assistant Examiner—Ardith E. Hertzog
(74) Attorney, Agent, or Firm—Linda K. Russell

(57) ABSTRACT

A gas burner for use with a Claus furnace made up of at least five concentric tubes and the spaces formed between them. The diameters of the tubes increase radially outward so that the first tube has a smaller diameter than the fifth tube. At the end of the burner closest to the furnace, the tube ends of the third, fourth, and fifth tubes lie in the same plane. The first and the second tubes are fastened together and capable of movement along the central longitudinal axis of the burner, but their ends closest the furnace are not capable of moving past the plane formed by the third, fourth, and fifth tubes. An injector is located between the first and second tubes at the end closest the furnace. The injector is oriented towards the periphery of the burner.

29 Claims, 3 Drawing Sheets

BURNER AND METHOD FOR PARTLY OXIDISING A GAS STREAM COMPRISING HYDROGEN SULPHIDE AND AMMONIA

BACKGROUND

The invention relates to a gas burner for a Claus furnace, composed of at least five concentric tubes (T1–T5), forming five concentric spaces for the introduction of gas, the first tube (T1) being the tube of smallest diameter and the fifth tube (T5) being that of the largest diameter, in which:

the ends on the side facing in the Claus furnace of the third, fourth and fifth tubes lie in the same plane;

the two central tubes (T1, T2) are fastened together and able to move along the central longitudinal axis of the burner with respect to the other tubes (T3–T5), their ends on the side facing the Claus furnace not being able to pass beyond the plane formed by the ends of the three other tubes; and the space formed between the first and second tubes (T1, T2) terminates, on the side facing the Claus furnace, in an injector oriented towards the periphery of the burner in the direction of injection of the gases into the burner.

Depending on the ammonia content of the ammonia-containing gas to be treated in the Claus furnace, the two central tubes (T1, T2) are moved so as to obtain complete removal of the ammonia.

The present invention relates to a burner and to a partial oxidation process, in a Claus furnace, for a stream of gas comprising hydrogen sulphide and ammonia by reaction with a stream of oxygen-rich gas.

Gas streams rich in hydrogen sulphide are waste gases produced by many industries, especially the oil refining industry and the production of natural gas. Especially for environmental reasons, these gases rich in hydrogen sulphide cannot be released as such into the atmosphere. It is therefore necessary to treat them for the purpose of substantially reducing their hydrogen sulphide content. A process well known for treating these gases rich in hydrogen sulphide is the modified Claus process, commonly called the Claus process.

This process comprises a thermal part and a catalytic part. In the thermal part, two main reactions are carried out. The first reaction consists in reacting a portion of the hydrogen sulphide with oxygen in order to produce water and sulphur dioxide in the following manner:

$$H_2S + 3/2 O_2 \rightarrow H_2O + SO_2 \qquad (i)$$

By this first reaction, approximately ⅓ of the hydrogen sulphide to be treated is oxidized. The remaining ⅔ are reacted with the sulphur dioxide formed during the above first step, according to the following reaction, called the Claus reaction:

$$2H_2S + SO_2 \rightleftharpoons 3/2 S_2 + 2H_2O \qquad (ii)$$

The combustion products are then cooled in a heat recovery boiler and then in a first condenser in which the elemental sulphur is recovered in liquid form. The gases are then reheated to a temperature allowing them to be treated on one or more catalytic beds (each of these beds being followed by a condenser). The Claus reaction continues on the catalytic beds until a hydrogen sulphide degree of conversion is obtained which is compatible with the standards governing the discharge of sulphur dioxide coming from the final step of the process, which is the incineration of the residual $H_2S$. In the case in which two or three catalytic beds do not allow the sulphur dioxide discharge standards to be reached, a tail gas treatment unit may be added before the waste gases are sent to the final incinerator.

Refinery-treated gas streams rich in hydrogen sulphide may sometimes contain ammonia in addition to hydrogen sulphide. This is the case, for example, with the waste gases resulting from acid-water strippers in which the condensates of the processes (for example, the hydrocracking or catalytic cracking step in particular in the case of high hydrodesulphurization charges) are steam-stripped so as to recover the hydrogen sulphide and the ammonia. Typically, these gases are composed of one third hydrogen sulphide, one third ammonia and one third water vapour.

During the treatment of these gas streams by the Claus process, the destruction of the ammonia therein must be as complete as possible in order to avoid severe operational problems in the Claus unit. This is because, downstream of the heat recovery boiler, deposits of ammonium salts in the cold lines or on the output side of the condensers may cause blockages, degradation in the performance of the unit and eventually an increase in sulphur dioxide emissions. When the Claus process is being implemented, the ammonia may be destroyed by various chemical reactions (oxidation, thermal dissociation) which take place at the same time as the first reaction (i) of the Claus process.

It is recognized that destruction of the ammonia present in the gases containing hydrogen sulphide is favoured by a high temperature. This destruction may be implemented with Claus oxidation processes involving only air or processes involving both air and oxygen.

In oxidation processes involving only air, the treatment of the gases containing hydrogen sulphide and ammonia may be carried out:

either by using a two-zone furnace with by-pass of a portion or of all of the gases not containing ammonia. This solution makes it possible to increase the temperature of the first zone in which all of the gas containing ammonia is oxidized. Its drawback is that it can cause poor destruction of the hydrocarbon- or amine-type contaminants present in the gas not containing ammonia and create problems other than the deposition of ammonium salts (for example, coking of the downstream catalysts);

or by using refinery fuel gas to increase the temperature in the reaction furnace. The major drawback with this operation is the increase in the amount of gas passing through the unit, something which may result in a bottleneck. In addition, introducing refinery fuel gas into the Claus furnace has a tendency to increase the $CS_2$ and COS contents in the case in which the fuel gas contains a great deal of $CO_2$ in the gases coming from the Claus furnace, and this results in a lowering in the performance of the catalytic beds downstream of the furnace.

In oxidation processes involving both air and oxygen, that is to say in which the combustion air is replaced with an air/oxygen mixture, it is possible to obtain better treatment of the gases containing hydrogen sulphide and ammonia, since the enrichment of the combustion air with oxygen increases the temperature in the reaction furnace and thus improves the destruction of the ammonia. However, in this case, not only is the temperature of the gases containing ammonia increased, but also that of the gases not containing ammonia; the amount of oxygen used is therefore not optimized. Furthermore, the temperature obtained is not always compatible with the metallurgical characteristics of the burner used.

To solve the problem of the use of oxygen specifically to increase the temperature of the gas containing ammonia, specific burners have been proposed which allow a separate feed:

for the air;

for the pure oxygen or for the oxygen-enriched air;

for the gases containing ammonia; and for the gases not containing ammonia.

Using these specific Claus burners, allowing separate confinement of the streams of the various gases, it has been possible to obtain hotter or cooler zones inside the flame. This allows localized temperature increases dedicated to the destruction of ammonia and makes it possible at the same time to maintain a "cooler" temperature for the oxidation of the other gases and in contact with the refractories of the furnace. This type of burner is disclosed, for example, in the applications EP-A1-0 810 974 and EP-A1-0 974 552.

The dimensioning of these Claus burners is carried out, among other characteristics, on the basis of a reference ammonia-containing gas having an average ammonia content and an average flow rate. The term "dimensioning" is understood essentially to mean the diameters of the tubes feeding the burner with the various gases. However, depending on the operating conditions of the refining units located upstream of the Claus unit (for example a severity of the hydrocracker or the hydrodesulphurization unit), the ammonium content of the gas to be treated may vary greatly, temporarily or otherwise, in relation to the content of the reference ammonia-containing gas. For example, for a refining site comprising a hydrocracker, depending on whether this hydrocracker is operating or not, the ammonia content of the gas to be treated may vary between 15 and 35%. This variation may also be due to poor operation of the acid-water stripping unit (for example malfunction of the condenser). The amount of oxygen to be injected in order to completely destroy the ammonia is then different and therefore the dimensioning of the Claus burner must be different if it is desired to obtain optimum removal of the ammonia in the Claus unit. However, to change the dimensions of the burner means changing the burner itself, something which cannot be envisaged for each appreciable change in the gas to be treated.

SUMMARY

The problem of the present invention is therefore to respond to the variations in the average characteristics of the ammonia-containing gas, especially its $NH_3$ content, to be treated in a Claus burner with separate gas feeds.

One objective of the present invention is to provide an oxidation process in a Claus furnace allowing complete destruction of the ammonia.

Another objective is to provide an oxidation process in a Claus furnace allowing complete destruction of the ammonia whatever the average ammonia content of the gas to be oxidized.

To meet these objectives, the invention relates firstly to a gas burner for a Claus furnace, composed of at least five concentric tubes (T1–T5), forming five concentric spaces for the introduction of gas, the first tube (T1) being the tube of smallest diameter and the fifth tube (T5) being that of largest diameter, in which:

the ends on the side facing the Claus furnace of the third, fourth and fifth tubes lie in the same plane;

the two central tubes (T1, T2) are fastened together and able to move along the central longitudinal axis of the burner with respect to the other tubes (T3–T5), their ends on the side facing the Claus furnace not being able to pass beyond the plane formed by the ends of the three other tubes; and the space formed between the first and second tubes (T1, T2) terminates, on the side facing the Claus furnace, in an injector oriented towards the periphery of the burner in the direction of injection of the gases into the burner.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
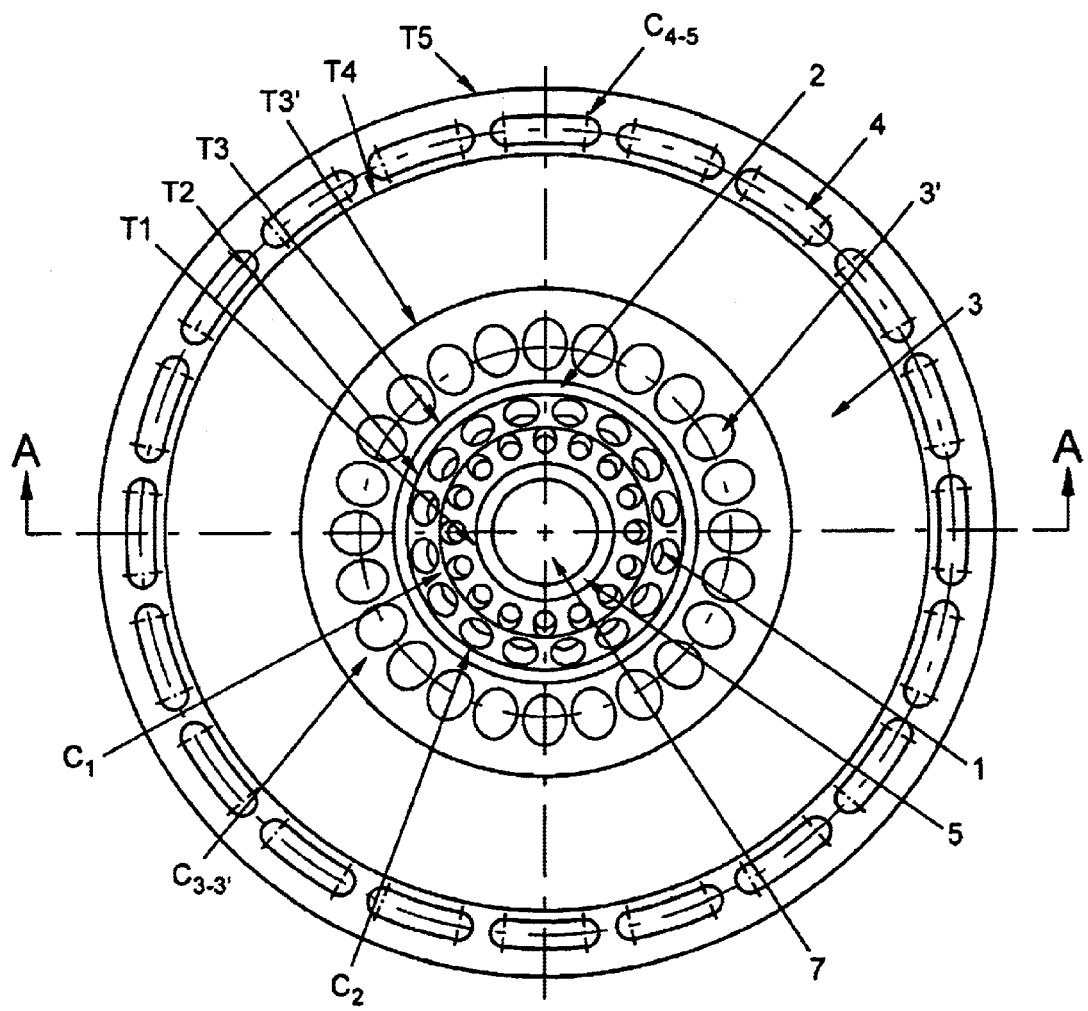
FIG. 1 illustrates a front end view of one embodiment, according to the invention, of a burner.

The invention therefore relates to a burner for introducing gases via five different channels separated from one another by coaxial tubes. On one side, the ends of these tubes run into the Claus furnace where the injected gases are burnt. On the other side, each of these tubes is connected to a gas supply. The three larger-diameter tubes (T3, T4, T5) are stationary. The ends on the side facing the furnace of these three tubes lie in the same plane perpendicular to the central axis of the tubes. The two smaller-diameter tubes (T1, T2) are fixed relative to each other and their ends on the side facing the furnace lie in the same plane perpendicular to the central axis of the tubes, but the combination of these two tubes can move relative to the three other tubes. Thus, this combination of two tubes can slide along the central axis of the tubes, which also corresponds to the central longitudinal axis of the burner, and in both directions of this axis. However, this forward or rearward movement does not lead on the side facing the furnace to the ends of the two smaller-diameter tubes passing beyond the ends of the three other tubes.

This movement of the two central tubes (T1, T2) may be obtained by any means known to those skilled in the art and especially using a mechanical bellows which is generally placed at the opposite end of these two tubes from the furnace. This bellows may be positioned so that the longitudinal axis of the bellows is parallel to the first and second tubes (T1, T2) and so that the first end of the bellows is stationary and the second end of the bellows can move and cooperate with the outer wall of the second tube (T2). Thus, by compressing or extending the bellows, the second end of the bellows cooperating with the outer wall of the second tube (T2) will in its movement drive the second tube (T2) and the first tube (T1), since the latter is fastened to the second tube (T2). This mechanical bellows is generally controlled by means of a screw which, depending on the direction in which it rotates, compresses or extends the bellows and therefore advances or retracts the central tubes (T1, T2).

According to the invention, the injector that terminates the space formed between the first and second tubes (T1, T2)

must have a shape such that the gas introduced into it is directed towards the periphery of the burner in the direction of injection of the gases into the burner. Such an injector may be obtained by an inflexion of the ends on the side facing the furnace of the first and second tubes towards the periphery of the burner. The injector may also be in the form of a metal ring drilled with at least one ring of orifices. The expression "ring of orifices" is understood to mean orifices all placed at an equidistance from the central axis of the burner. According to a preferred embodiment, the metal ring is drilled with two concentric rings (C1, C2) of orifices oriented towards the periphery of the burner in the direction of injection of the gases into the burner. For practical reasons, all the orifices of the same ring of orifices are generally oriented at the same angle relative to the central axis of the burner. However, the orifices may also be oriented at different angles, this embodiment allowing better mixing of the gases by a turbulence effect. If, for each of the two concentric rings of orifices, all the orifices of the same ring of orifices are oriented at the same angle relative to the central axis of the burner, then the angles of the orifices of the two concentric rings of orifices are preferably different and the difference between these angles of orientation is at least 5°. Thus, the orifices of the smaller ring of orifices may be oriented towards the periphery of the burner at an angle of between 5 and 45° relative to the central axis of the burner. The orifices of the larger ring may be oriented towards the periphery of the burner at an angle of between 10 and 50° relative to the central axis of the burner. The space formed between the first and second tubes is usually connected at the opposite end from the furnace to a supply of a gas containing hydrogen sulphide and ammonia, called ammonia-containing gas.

A pilot burner may be placed in the first tube, the diameter of this pilot burner having to be less than that of the first tube so as to be able to introduce an ignition gas (refinery fuel gas) into the remaining free space of the first tube. In general, when the first tube T1 is moved, its movement does not cause the pilot burner to move.

The space formed between the second and third tubes (T2, T3) is usually connected to a supply of an oxygen-containing gas.

Preferably, the outermost space formed between the fourth and fifth tubes (T4, T5) terminates, on the side facing the Claus furnace, in an injector oriented towards the centre of the burner in the direction of injection of the gases into the burner. Such an injector may be obtained by an inflexion of the ends on the side facing the furnace of the fourth and fifth tubes towards the centre of the burner. The injector may also be in the form of a metal ring closing off this space and drilled with at least one ring of orifices for passage of the gas present in this space. These orifices are drilled in the metal ring so that they are oriented towards the centre of the burner in the direction of injection of the gases into the burner. For practical reasons, it is preferable for all the holes in the ring of orifices to be oriented at the same angle relative to the central axis of the burner. However, the orifices may also be oriented at different angles, this embodiment allowing better mixing of the gases by a turbulence effect. Before the orifices of the same ring of orifices are oriented at the same angle relative to the central axis of the burner, then these orifices of the ring are preferably oriented towards the centre of the burner at an angle of between 5 and 45°, even more preferably between 10 and 20°, relative to the central axis of the burner. The cross section of these orifices may be of any shape. The space formed between the fourth and fifth tubes is usually connected to a supply of a gas containing hydrogen sulphide but not ammonia, called acid gas.

According to an alternative embodiment of the invention, the burner includes an intermediate tube (T3') placed between the third tube (T3) and the fourth tube (T4). This intermediate tube (T3') is stationary like the third, fourth and fifth tubes (T3, T4 and T5) and its end on the side facing the furnace lies in the same plane perpendicular to the central axis of the third, fourth and fifth tubes (T3, T4 and T5). According to this alternative embodiment, the space formed between the third tube (T3) and the intermediate tube (T3') preferably terminates on the side facing the Claus furnace in an injector oriented towards the centre of the burner in the direction of injection of the gases into the burner. Such an injector may be obtained by an inflexion of the ends on the side facing the furnace of the third tube (T3) and of the intermediate tube (T3') towards the centre of the burner. On the side facing the furnace, the injector may also be in the form of a metal ring ($C_{3-3'}$) closing off the end of this space and drilled with at least one ring of orifices for passage of the gas present in this space. These orifices are drilled in the metal ring so that they are oriented towards the centre of the burner in the direction of injection of the gases into the burner. For practical reasons, it is preferable for all the orifices in a ring of orifices to be oriented at the same angle relative to the central axis of the burner. However, the orifices may also be oriented at different angles, this embodiment allowing better mixing of the gases by a turbulence effect. If all the orifices of the same ring of orifices are oriented at the same angle relative to the central axis of the burner, then these orifices are preferably oriented towards the centre of the burner at an angle of between 5 and 45° relative to the central axis of the burner. These orifices may have any shape.

According to the latter alternative embodiment, the space formed between the third tube (T3) and the intermediate tube (T3') and the space formed between the third and fourth tubes (T3, T4) may be connected to the same supply of an oxygen-containing gas. In general, a valve is placed between the supply of the oxygen-containing gas and the space formed between the third tube (T3) and the intermediate tube (T3').

The diameters of the five tubes and the diameters of the orifices in the rings (injectors) are defined according to the velocities in the tubes and to the ratios of the velocities at the nose of the burner that it is desired to give each of these gases injected into the burner. The velocities in the tubes depend on the average flow rates of the streams entering the burner. The flow rates of the oxygen-rich gases depend directly on their oxygen concentration, on the flow rates of the streams of acid gases and on the average $NH_3$ content of the ammonia-containing gas. The average flow rates of the streams are set by the refinery in which the process of the invention is carried out, which is itself limited by the treatment possibilities of the Claus unit (dimensions of the Claus furnace and characteristics of the heat exchanger placed at the outlet of the said Claus furnace). Depending on these parameters, a person skilled in the art is perfectly capable of determining the diameters of the tubes and the diameters of the orifices so that the desired velocities and velocity ratios are obtained.

In general, the diameters of the orifices of the rings must be such that:

the ratio of the velocity of the ammonia-containing gas to the velocity of the oxygen-rich gas is between 0.1 and 0.8 or between 1.2 and 5, the velocities being taken at the end of the burner on the side facing the furnace; and the ratio of the velocity of the acid gas to the velocity of the gas less rich in oxygen is between 0.1 and 0.8 or between 1.2 and 5, the velocities being taken at the end of the burner on the side facing the furnace.

The burner according to the invention is preferably made of an austenitic alloy containing chromium and a high nickel content.

The invention also relates to a first partial oxidation process in a Claus furnace for a stream of gas containing hydrogen sulphide and ammonia, referred to as ammonia-containing gas, and for a stream of gas containing hydrogen sulphide and no ammonia, referred to as acid gas, using a stream of oxygen-containing gas, in which process:

the burner defined above is used;

if the $NH_3$ content of the ammonia-containing gas to be treated is greater than the average $NH_3$ content of the ammonia-containing gas for which the burner is designed, the central tubes (T1, T2) are positioned so that their ends on the side facing the furnace lie in a plane different from that of the ends of the other tubes (T3–T5);

if the $NH_3$ content of the ammonia-containing gas to be treated is less than or equal to the average $NH_3$ content of the ammonia-containing gas for which the burner is designed, the central tubes (T1, T2) are positioned so that their ends on the side facing the furnace lie in the same plane as that of the ends of the other tubes (T3–T5);

the ammonia-containing gas is injected into the space formed by the first and second tubes (T1, T2);

the acid gas is injected into the space formed by the fourth and fifth tubes (T4, T5);

an oxygen-rich gas is injected into the space formed by the second and third tubes (T2, T3); and a gas less rich in oxygen is injected into the space formed by the third and fourth tubes (T3, T4).

The burner used in this first process has the features of the burner defined above. Furthermore, this burner is designed for complete elimination of the ammonia contained in the ammonia-containing gas which is introduced into it and is so for an average value of the $NH_3$ concentration in the ammonia-containing gas, the ammonia being completely removed for this average value when the central tubes (T1, T2) are pushed completely towards the end of the burner on the side facing the furnace, referred to as the forward position.

According to this first process of the invention, when an appreciable change in the operating conditions of the Claus unit, owing to the presence of ammonia, or of the refinery units producing the ammonia-containing gases is observed, the average $NH_3$ content in the ammonia-containing gas to be treated is measured. Depending on the difference between the measured value of the $NH_3$ concentration of the ammonia-containing gas to be treated and the average $NH_3$ concentration value of the ammonia-containing gas for which the burner is designed, the ends of the central tubes (T1, T2) are positioned relative to the ends of the other tubes (T3–T5) corresponding to the end of the burner on the side facing the furnace. Thus, the ends on the side facing the furnace of the central tubes (T1, T2) are moved further away from the ends on the side facing the furnace of the other tubes (T3–T5) if the measurement of the $NH_3$ content in the ammonia-containing gas to be treated is greater than the average $NH_3$ concentration value of the ammonia-containing gas for which the burner is designed. The central tubes of the furnace are therefore moved back. This operation has the effect of allowing, at the ends of the two central tubes (T1, T2) on the side facing the furnace, the ammonia-containing gas to be treated to be mixed with a gas richer in oxygen, and therefore of increasing the temperature of the flame at this point and of consequently increasing the ammonia conversion yield. It is therefore possible to respond to the increase in ammonia concentration in the ammonia-containing gas to be treated and to obtain effective destruction of this species without changing burner. On the other hand, if the measurement of the $NH_3$ content in the ammonia-containing gas to be treated is less than or equal to the average $NH_3$ concentration value of the ammonia-containing gas for which the burner is designed, the central tubes are pushed towards the end of the burner on the side facing the furnace, so as to place the ends on the side facing the furnace of all the tubes (T1–T5) in the same plane and thus allow mixing of the ammonia-containing gas to be treated with a gas less rich in oxygen.

This first process according to the invention is generally implemented in a conventional Claus furnace.

According to this first process, a burner that includes an intermediate tube (T3') may be used, for which a valve is placed between the supply of gas less rich in oxygen and the space formed between the third tube (T3) and the intermediate tube (T3'), as described above. When such a burner is used, the opening of the valve placed between the space formed between the third tube (T3) and the intermediate tube (T3') and the supply of gas less rich in oxygen may be controlled according to the flow rate of the acid gas, especially during the start-up phase of the unit or during the phase of stopping the oxygen feed.

This first process according to the invention applies to any type of ammonia-containing gas. In general, the hydrogen sulphide concentration in the stream of ammonia-containing gas is generally between 10 and 90 mol %; the ammonia concentration in this stream of gas is generally greater than or equal to 5 mol % and preferably between 10 and 60 mol %. This gas may also contain 10 to 60 mol % of water vapour.

In the first process according to the invention, the oxygen-containing gases may be air or oxygen-enriched air, the latter being preferably enriched with a content of greater than 25 mol %, even more preferably a content of between 40 and 100 mol %, the gas enriched to 100% oxygen corresponding to pure oxygen. The oxygen content to which the said gas is enriched with oxygen corresponds to the molar fraction of oxygen of the said enriched gas. To take an example, air enriched to 50% oxygen consists of a gas mixture comprising 50 mol % oxygen. According to a preferred embodiment, the oxygen-rich gas is oxygen-enriched air, or pure oxygen, and the gas less rich in oxygen is air. When the burner used includes an intermediate tube (T3') between the third and fourth tubes, the gas less rich in oxygen may be introduced simultaneously into the space formed by the third tube and the intermediate tube and into the space formed by the intermediate tube and the fourth tube. These two spaces are connected to the same supply of gas less rich in oxygen.

According to the first process of the invention, the ammonia content of the gas containing hydrogen sulphide and not ammonia, referred to as acid gas, is less than 5 mol % (<5%). The hydrogen sulphide concentration in this gas stream may itself be at least 10 mol %, and more generally between 60 and 95 mol %. The stream of acid gas essentially consists of hydrogen sulphide and at least one of the following compounds: water vapour, carbon dioxide, hydrocarbons and other sulphur compounds.

The invention also relates to a second partial oxidation process in a Claus furnace for a stream of gas containing hydrogen sulphide and not ammonia, referred to as acid gas, using at least one stream of oxygen-containing gas, in which:

the burner defined above is used;

the acid gas is injected into the space formed by the first and second tubes (T1, T2) and into the space formed by the fourth and fifth tubes (T4, T5); and at least one oxygen-containing gas is injected into the space formed by the second and third tubes (T2, T3) and into the space formed by the third and fourth tubes (T3, T4).

This second process is generally implemented as an alternative to the first process described above when the ammonia-containing gas is not available, for example during the shut-down of the refining units producing ammonia-containing gas. In this case, the acid gas is introduced instead of the ammonia-containing gas into the space formed by the first and second tubes (T1, T2) in addition to its usual introduction into the space formed by the fourth and fifth tubes (T4, T5).

Simultaneously with the introduction of the acid gas, at least one oxygen-containing gas is injected into the spaces formed by the second and third tubes (T2, T3) and by the third and fourth tubes (T3, T4). It is possible either to introduce the same oxygen-containing gas (generally air) into these two spaces or to introduce gases having different oxygen concentrations, as was described in the operation of the first process according to the invention.

Figure 2:
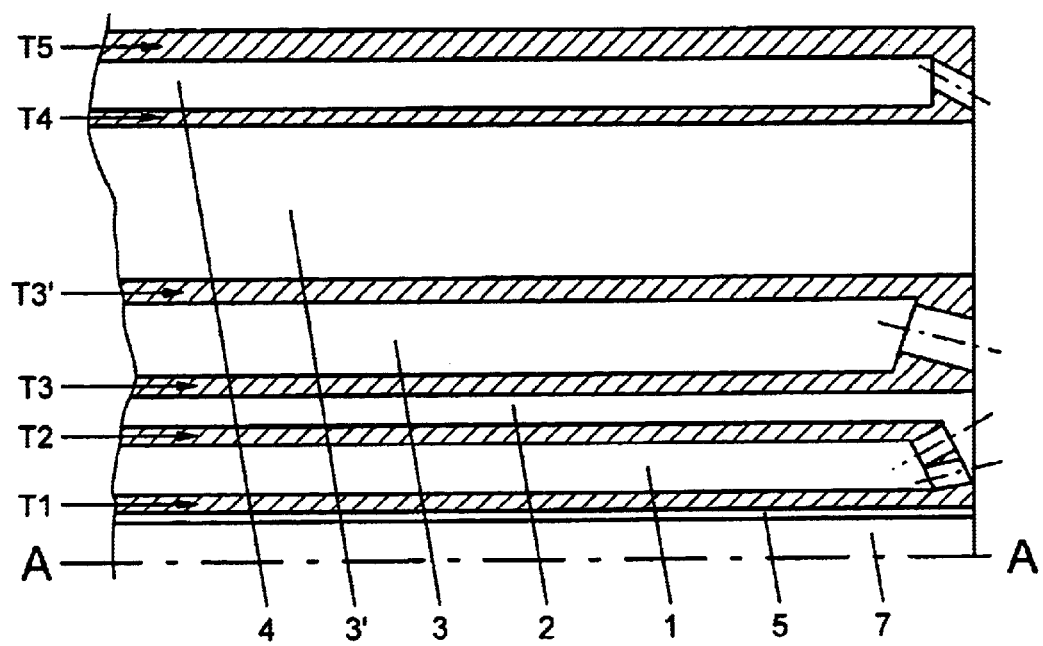
FIG. 2 illustrates a sectional view, of the embodiment shown in FIG. 1.
Figure 3:
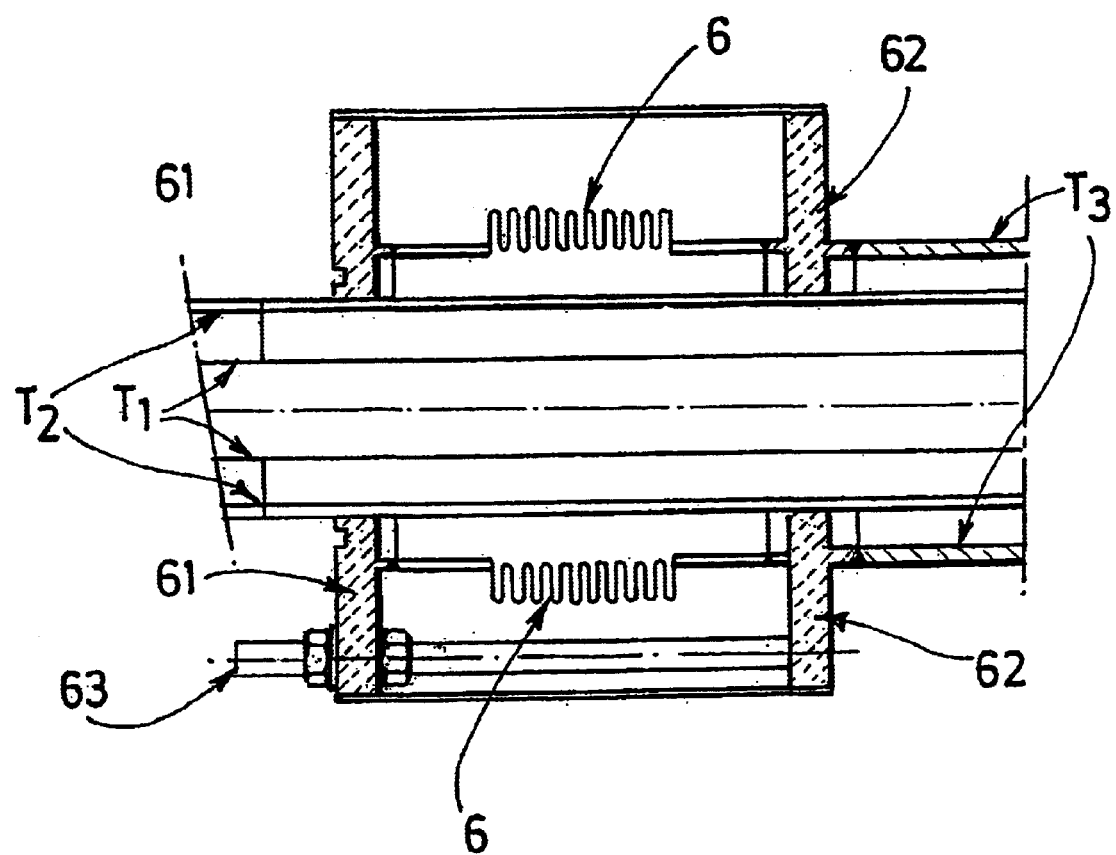
FIG. 3 illustrates a detail of one embodiment, according to the invention, which highlights a bellows means for moving the first and second tubes

FIGS. 1, 2 and 3 illustrate the burner and the first process according to the invention. The burner consists of six concentric tubes (T1, T2, T3, T3', T4, T5) forming six concentric spaces. At the end on the side facing the furnace:

the space formed by the first and second tubes (T1, T2) runs into two rings of orifices (C1, C2), the said orifices having a circular cross section;

the space formed by the third tube (T3) and the intermediate tube (T3') runs into a ring of orifices ($C_{3-3'}$), the said orifices having a circular cross section; and the space formed by the fourth and fifth tubes (T4, T5) runs into a ring of orifices ($C_{4-5}$), the said orifices having an oval cross section.

At the end of the space formed by the first and second tubes (T1, T2), all the orifices of the ring of smaller diameter (C1) are oriented towards the periphery of the burner at the same angle relative to the central axis of the burner and all the orifices of the larger-diameter ring (C2) are oriented towards the periphery of the burner at the same angle relative to the central axis of the burner. At the end of the space formed by the third tube and the intermediate tube (T3, T3'), all the orifices of the ring ($C_{3-3'}$) are oriented towards the centre of the burner at the same angle relative to the central axis of the burner. At the end of the space formed by the fourth and fifth tubes (T4, T5), all the orifices of the ring ($C_{4-5}$) are oriented towards the centre of the burner at the same angle relative to the central axis of the burner.

A pilot burner (5) is placed in the first tube (T1) in order to ignite the flame. A refinery fuel gas (7) is also introduced into this space in order to ignite the flame and to maintain it.

A bellows (6) is fixed at its end (61) to the tube (T2) and at its other end (62) to the stationary tube (T3). A screw (63) allows the bellows to be compressed or extended.

The following are introduced into the burner:

the gas containing hydrogen sulphide and ammonia (1) in the space formed by the first and second tubes (T1, T2);

the oxygen-rich gas (2) in the space formed by the second and third tubes (T2, T3);

the gas less rich in oxygen (3) in the space formed by the third tube (T3) and the intermediate tube (T3') and in the space formed by the intermediate tube (T3') and the fourth tube (T4); and the acid gas (4) in the space formed by the fourth and fifth tubes (T4, T5).

If the value of the ammonia content of the ammonia-containing gas is greater than the average ammonia content of this gas set for the design of the burner, then the central tubes (T1, T2) are pushed back towards the rear position by operating the screw controlling the displacement of the bellows. If thereafter the value of the ammonia content of the ammonia-containing gas becomes close to or less than the average ammonia content of this gas set for the design of the burner, then the central tubes (T1, T2) are pushed into the forward position by operating this same screw.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used as a gas burner for a Claus furnace, said apparatus comprising at least five concentric tubes and the corresponding concentric spaces between said tubes, wherein:

a) the diameters of said tubes increase in a radially outward direction from the central longitudinal axis of said apparatus, such that the first tube has a smaller diameter than the fifth tube;

b) the tube ends, nearest said Claus furnace, of the third, fourth, and fifth tubes lie in substantially the same plane;

c) the first and second tubes are fastened together and are capable of movement, with respect to said third, fourth and fifth tubes, along said central longitudinal axis;

d) the tube ends, nearest said Claus furnace, of said first and second tubes are unable to pass beyond said plane formed by said ends of said third, fourth and fifth tubes; and e) the first space, formed by said first and second tubes, terminates on the side nearest said Claus furnace, in a first injector, wherein said first injector is oriented, in the direction of gas injection into said apparatus, towards the periphery of said apparatus.

2. The apparatus of claim 1, further comprising an intermediate tube located between said third tube and said fourth tube.

3. The apparatus of claim 2, wherein the intermediate space, formed by said intermediate and third tubes, terminates on the side nearest said Claus furnace in an intermediate injector, wherein said intermediate injector is oriented, in the direction of gas injection into said apparatus towards the center of said apparatus.

4. The apparatus of claim 3, wherein said intermediate injector comprises a metal ring with at least one ring of orifices.

5. The apparatus of claim 4, wherein said intermediate orifices are oriented toward the center of said apparatus at an angle, relative to said central axis, of about 5° to about 45°.

6. The apparatus of claim 2, wherein the intermediate space, located between said intermediate and third tubes, and the third space, located between said third and fourth tubes, are both connected to the same supply of oxygen-containing gas.

7. The apparatus of claim 6, further comprising a valve located between said supply and said intermediate space.

8. A method which may be used for partially oxidizing an acid gas with at least one oxygen-rich gas, wherein:
   a) the burner according to claim 7 used;
   b) said acid gas contains hydrogen sulfide and is substantially free of ammonia;
   c) said acid gas is injected into said first space and the fourth space formed between said fourth and fifth tubes; and
   d) said oxygen-containing gas is injected into the second space, formed between said second and third tubes, and into the third space, formed between said third and fourth tubes.

9. The apparatus of claim 1, wherein said first injector comprises a metal ring drilled with at least one ring of orifices.

10. The apparatus of claim 9, wherein said first injector comprises a metal ring with a first and a second concentric ring of orifices, wherein said orifices are oriented, in the direction of gas injection into said apparatus, towards the periphery of said apparatus.

11. The apparatus of claim 10, wherein on said first and second concentric ring of orifices, all orifices on the same ring are oriented at the same angle relative to said central axis.

12. The apparatus of claim 11, wherein said orifice angle of said first ring differs from said orifice angle of said second ring by at least about 5°.

13. The apparatus of claim 10, wherein the orifices of said first ring are oriented towards said periphery at an angle, relative to said central axis, of about 5° to about 45°.

14. The apparatus of claim 10, wherein the orifices of said second ring are oriented towards said periphery at an angle, relative to said central axis, of about 10° to about 50°.

15. The apparatus of claim 1, wherein the fourth space, formed by said fourth and fifth tubes, terminates on the side nearest said Claus furnace, in a fourth injector, wherein said fourth injector is oriented, in the direction of gas injection into said apparatus, towards the center of said apparatus.

16. The apparatus of claim 15, wherein said fourth injector comprises at least one metal ring drilled with at least one ring of orifices.

17. The apparatus of 16, wherein said fourth injector orifices are oriented toward the center of said apparatus at an angle, relative to said central axis, of about 5° to about 45°.

18. The apparatus of claim 1, wherein said first and second tubes are moved with a mechanical bellows means.

19. The apparatus of claim 1, further comprising a pilot burner located in said first tube.

20. A method which may be used for partially oxidizing an acid gas with at least one oxygen-rich gas, wherein:
   a) the burner according to claim is used;
   b) said acid gas contains hydrogen sulfide and is substantially free of ammonia;
   c) said acid gas is injected into said first space and the fourth space formed between said fourth and fifth tubes; and
   d) said oxygen-containing gas is injected into the second space, formed between said second and third tubes, and into the third space, formed between said third and fourth tubes.

21. A method which maybe used for a partially oxidizing an ammonia containing gas and an acid gas, in a Claus furnace, with at least one oxygen-rich gas comprising:
   a) introducing said ammonia gas, said acid gas and said oxygen-containing gases to said furnace with a burner, wherein said burner comprises at least five concentric tubes and the corresponding concentric spaces between said tubes, wherein:
      1) the diameters of said tubes increase in a radially outward direction from the central longitudinal axis of said apparatus such that the first tube has a smaller diameter than the fifth tube;
      2) the tube ends, nearest said Claus furnace, of the third, fourth, and fifth tubes lie in substantially the same plane;
      3) the first and second tubes are fastened together and are capable of movement, with respect to said third, fourth and fifth tubes, along said central longitudinal axis;
      4) the tube ends, nearest said Claus furnace, of said first and second tubes are unable to pass beyond said plane formed by said ends of said third, fourth and fifth tubes; and
      5) the first space, formed between said first and second tubes, terminates on the side nearest said Claus furnace, in a first injector, wherein said first injector is oriented, in the direction of gas injection into said apparatus, towards the periphery of said apparatus;
   b) positioning said first and second tubes, when the ammonia content of said ammonia-containing gas is greater than the average ammonia content for which said burner is designed, such that said first and second tube ends lie in a plane different from that of said third, fourth and fifth tube ends;
   c) positioning said first and second tubes, when said ammonia content of said ammonia-containing gas is less than said average ammonia content for which said burner is designed, such that said first and second tube ends lie in a plane substantially the same as that of said third, fourth and fifth tube ends:
   d) injecting said ammonia-containing gas into said first space;
   e) injecting said acid gas into the fourth space formed between said fourth and fifth tubes;
   f) injecting a first oxygen-rich gas into the second space formed between said second and third tubes; and
   g) injecting a second oxygen-rich gas into the third space formed between said third and fourth tubes.

22. The method of claim 21, wherein the oxygen concentration of said first oxygen-rich gas is greater than the oxygen concentration of said second oxygen-rich gas.

23. The method of claims 22, wherein said first and second oxygen-rich gases comprise oxygen-enriched air with an oxygen content greater than about 25 mol %.

24. The method of claim 23, wherein said oxygen content is between about 40 mol% and about 100 mol %.

25. The method of claim 22, wherein said first oxygen-rich gas comprises pure oxygen.

26. The method of claim 21, wherein said burner further comprises:
   a) an intermediate tube, formed between said third and said fourth tubes;
   b) an intermediate space, formed between said intermediate tube and said third tube, wherein said intermediate tube is connected a supply of said second oxygen-rich gas; and
   c) a valve located between said intermediate space and said supply of said second oxygen-rich gas.

27. The method of claim 26, further comprising controlling the opening of said valve based upon the flow rate of said acid gas.

28. The method of claim 21, wherein said ammonia-containing gas comprises hydrogen sulfide and ammonia.

29. The method of claim 21, wherein said acid gas comprises hydrogen sulfide and is substantially free of ammonia.

* * * * *

UNITED STATES PATENT AND TRADEMARK OFFICE
CERTIFICATE OF CORRECTION

PATENT NO. : 6,890,498 B2
DATED : May 10, 2005
INVENTOR(S) : Rémi Pierre Tsiava et al.

It is certified that error appears in the above-identified patent and that said Letters Patent is hereby corrected as shown below:

Column 11,
Line 3, replace the words "7 used" with -- 7 is used --.
Line 40, replace the words "of 16" with -- of claim 16 --.
Line 48, replace the words "claim is used" with -- claim 1 is used --.
Line 58, replace the words "maybe used for a partially" with -- may be used for a partially --.

Column 12,
Line 55, replace the words "connected a supply" with -- connected to a supply --.

Signed and Sealed this

Twelfth Day of July, 2005

JON W. DUDAS
*Director of the United States Patent and Trademark Office*